United States Patent
Ions et al.

(10) Patent No.: US 8,156,709 B2
(45) Date of Patent: Apr. 17, 2012

(54) DIRECT SMELTING PLANT

(75) Inventors: Philip James Ions, Shelley (AU); Mark Hayton, Bateman (AU)

(73) Assignee: Technological Resources Pty. Limited, Melbourne (AU)

( * ) Notice: Subject to any disclaimer, the term of this patent is extended or adjusted under 35 U.S.C. 154(b) by 965 days.

(21) Appl. No.: 10/593,063

(22) PCT Filed: Mar. 17, 2005

(86) PCT No.: PCT/AU2005/000390

§ 371 (c)(1),
(2), (4) Date: Apr. 28, 2008

(87) PCT Pub. No.: WO2005/090613

PCT Pub. Date: Sep. 29, 2005

(65) Prior Publication Data

US 2008/0202061 A1    Aug. 28, 2008

(30) Foreign Application Priority Data

Mar. 17, 2004 (AU) ............................ 2004901418
Mar. 29, 2004 (AU) ............................ 2004901688

(51) Int. Cl.
*E04B 1/08* (2006.01)
*E04B 1/343* (2006.01)

(52) U.S. Cl. ............... 52/745.03; 52/169.6; 52/169.5; 52/135; 52/131; 52/745; 266/177; 266/197

(58) Field of Classification Search ............ 52/169.5, 52/169.6, 135, 131, 79.2, 79.1; 266/177, 266/197

See application file for complete search history.

(56) References Cited

U.S. PATENT DOCUMENTS

| | | | |
|---|---|---|---|
| 3,009,778 A * | 11/1961 | Tardieu et al. | 423/113 |
| 3,467,368 A * | 9/1969 | MacKay et al. | 266/186 |
| 4,089,139 A * | 5/1978 | Moffa et al. | 52/20 |
| 4,896,865 A * | 1/1990 | Persson | 266/285 |
| 5,489,325 A | 2/1996 | Keogh et al. | |
| 5,811,057 A | 9/1998 | Hubble et al. | |

(Continued)

FOREIGN PATENT DOCUMENTS

DE    30 30 714 A1    2/1982

(Continued)

OTHER PUBLICATIONS

Supplementary European Search Report, dated Oct. 10, 2010.

(Continued)

*Primary Examiner* — Phi D. A

(74) *Attorney, Agent, or Firm* — Finnegan, Henderson, Farabow, Garrett & Dunner, L.L.P.

(57) ABSTRACT

Method of constructing and installing a direct smelting unit comprising a smelting vessel (11). The vessel is prefabricated off site in three modules (11A, 11B, 11C) which are then transported to the installation site where they are hoisted by a crane and deposited sequentially on top of one another and joined together by welding to form a unitary vessel. The vessel modules are prefabricated so as to be internally lined with water cooling panels connected to water inlet and outlet connectors (62) on the exterior of the circumferential wall sections of those modules. A vessel access tower is formed in modules brought together to envelop the tower and carrying water supply and return piping which is connected to the water inlet and outlet connectors (62) of the cooling panels.

21 Claims, 15 Drawing Sheets

U.S. PATENT DOCUMENTS

| | | | |
|---|---|---|---|
| 5,965,085 A * | 10/1999 | Abramin et al. | 266/199 |
| 6,267,799 B1 | 7/2001 | Innes et al. | |
| 6,270,553 B1 | 8/2001 | Innes | |
| 6,280,481 B1 * | 8/2001 | Storey-Laubach et al. | 8/142 |
| 6,289,034 B1 | 9/2001 | Bates | |
| 6,328,783 B1 | 12/2001 | Bates | |
| 6,423,114 B1 | 7/2002 | Burke | |

FOREIGN PATENT DOCUMENTS

| | | |
|---|---|---|
| DE | 34 05 137 A1 | 8/1985 |
| EP | 1 120 618 | 8/2001 |
| GB | 2 058 311 | 4/1981 |
| JP | 54058267 A * | 5/1979 |
| JP | 61026735 A * | 2/1986 |
| WO | WO 00/01854 | 1/2000 |
| WO | WO 01/11091 | 2/2001 |
| WO | WO 01/57458 | 8/2001 |

OTHER PUBLICATIONS

Derwent Abstract Accession No. 93-309404/39, 1993, Kawasaki Steel Corp.

Derwent Abstract Accession No. 90-153192/20, 1990, Inst Metal Bucurest.

Kawasaki Steel Corp; Furnace Construction or Repair System—Involves Use of Prefabricated Units on Site; Derwent Abstract of JP 59158983 A2, filed Sep. 8, 1984.

* cited by examiner

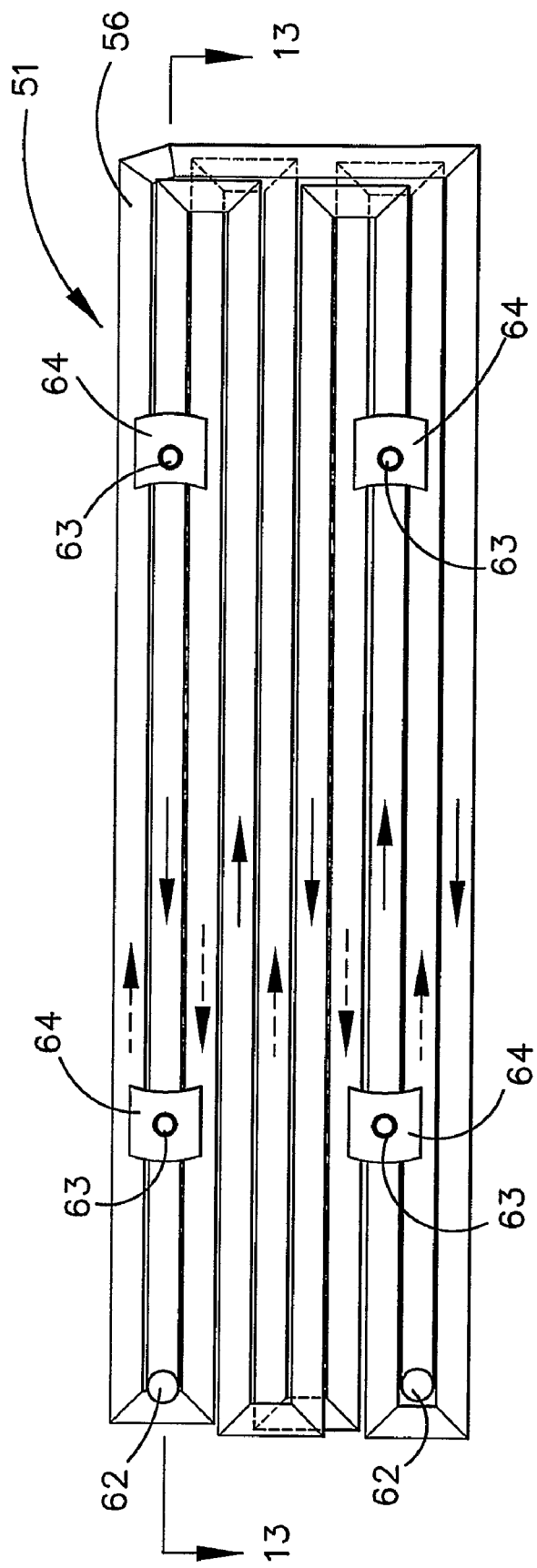
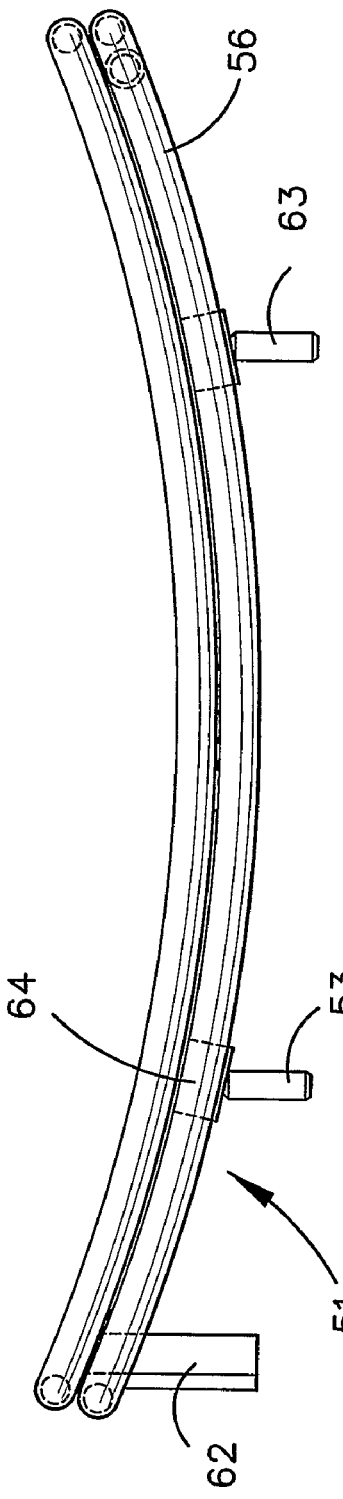
FIGURE 11
FIGURE 12

DIRECT SMELTING PLANT

CROSS REFERENCE TO RELATED APPLICATIONS

This application is a national phase application based on PCT/AU2005/000390 filed Mar. 17, 2005, and claims the priority of Australian Patent Application Nos. 2004901418, filed Mar. 17, 2004, and 2004901688, filed Mar. 29, 2004, the content of all of which is incorporated herein by reference.

TECHNICAL FIELD

The present invention relates to direct smelting plant for producing molten metal in pure or alloy form from a metalliferous feed material such as ores, partly reduced ores and metal-containing waste streams.

A known direct smelting process, which relies principally on a molten metal layer as a reaction medium, and is generally referred to as the HIsmelt process, is described in International Patent Publication WO 96/31627 (International Patent Application PCT/AU96/00197) in the name of the applicant. The HIsmelt process as described in the International application comprises:

(a) forming a bath of molten iron and slag in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. Offgases resulting from the post-combustion of reaction gases in the vessel are taken away from the upper part of the vessel through an offgas duct.

The HIsmelt process enables large quantities of molten metal to be produced by direct smelting in a single compact vessel. However, in order to achieve this it is necessary to transport hot gases to and from the vessel, to transport the metalliferous feed material to the vessel and to transport the molten metal product and slag away from the vessel all within a relatively confined area. This requires the installation of various major ancillary components in the plant. For example, there will generally be gas heating stoves and ducting for supply of heated input gas to the vessel; solids feed equipment for feeding ore and coal to the vessel which equipment may include apparatus for pre-heating the ore; offgas ducting and offgas treatment apparatus such as offgas scrubbing and demisting apparatus and molten metal and slag tapping and handling equipment. All of these components must operate continuously through a smelting operation which can be extended over a long period and it is necessary to provide for access to the vessel and ancillary components for maintenance and lifting of equipment between smelting operations.

Building a direct smelting plant of the kind described above presents major problems in that it is necessary to erect various kinds of major equipment sourced from different manufacturers at a single site area. The present invention facilitates offsite prefabrication and installation of one of the major plant components namely the iron making unit comprising the direct smelting vessel. This unit may also comprise a vessel access tower which may envelop the vessel.

DISCLOSURE OF THE INVENTION

The invention provides a method of constructing and thereafter installing at a direct smelting plant site a smelting unit comprising a direct smelting vessel, which method comprises the steps of prefabricating away from a predetermined location of the plant site for the direct smelting vessel, a base module and one or more further vessel modules to be brought together to form the vessel, each module comprising a circumferential vessel wall section formed of steel plate, transporting the prefabricated vessel modules to the predetermined location and depositing sequentially the base module and the one or more further vessel modules on top of one another and joining them together by one or more circumferential welds between successive circumferential wall sections of the modules to form a unitary direct smelting vessel.

The weld may be a continuous horizontal weld made on site after the modules to be connected have been deposited on top of one another.

The further modules may include an intermediate module and an upper module, the intermediate module being deposited onto the base module and connected to an upper part of the base module and the upper module being deposited on and connected to an upper part of the intermediate module.

The base module may include a hearth and a forehearth for discharging molten metal. The hearth and forehearth may be lined with refractory bricks after installation at the smelting plant site.

The intermediate vessel module may comprise a generally cylindrical barrel section provided with a tap hole for discharging molten slag.

The upper vessel module may be provided with an outlet for off gases.

At least one of the further modules may be prefabricated so as to be internally lined with water cooling panels connected to water inlet and outlet connectors on the exterior of the circumferential wall section of that module.

The intermediate module and the upper module may both be prefabricated with water cooling panels connected to water inlet and outlet connectors or the exterior of the circumferential wall sections of those modules.

The base module may also be partially lined with water cooled panels.

The method may also comprise the steps of prefabricating away from said predetermined location a plurality of tower modules to be brought together to form a vessel access tower, transporting the prefabricated tower modules to the predetermined location and depositing them sequentially on top of another and joining them together to form the tower.

The tower modules may be formed such that the tower will extend about the vessel at the completion of installation of the vessel and the tower.

At least one pair of the tower modules may be connected together at the same level as the connection between a pair of the vessel modules.

At least some of the tower modules may be installed before the vessel modules about which they are to extend are installed, the latter vessel modules being deposited downwardly into the interior of the installed tower modules.

The tower structure may carry water supply and return piping and the construction and installation method may include the further step of connecting that supply and return piping to the water inlet and outlet connectors of the water cooling panels.

BRIEF DESCRIPTION OF THE DRAWINGS

In order that the invention may be more fully explained, one particular embodiment will be described in some detail with reference to the accompanying drawings in which

FIG. 11 is an elevation of one of the cooling panels fitted to the cylindrical barrel section of the vessel;

FIG. 12 is a plan of the panel shown in FIG. 11;

DETAILED DESCRIPTION OF THE PREFERRED EMBODIMENT

Figure 1:
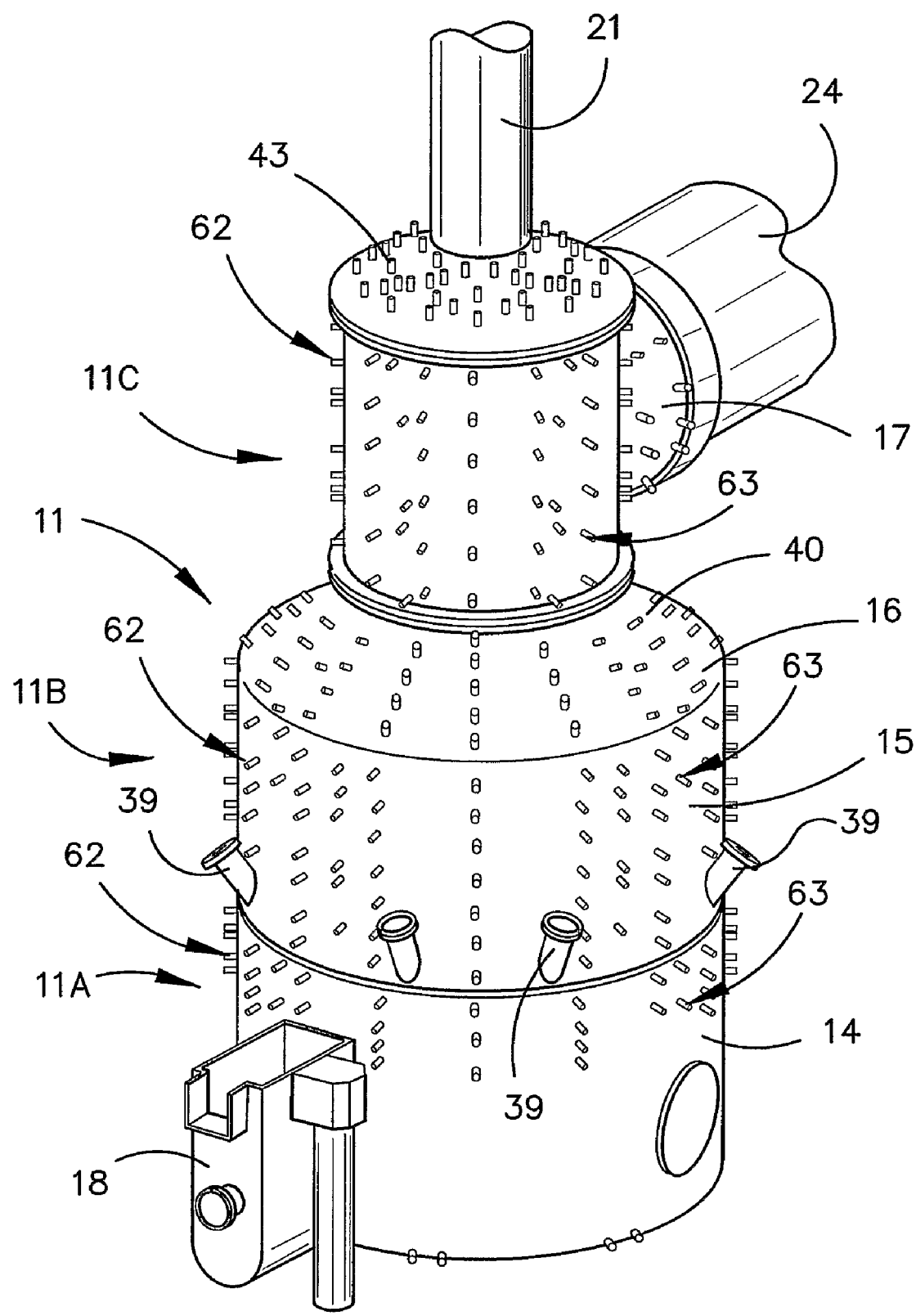
FIG. 1 is a diagrammatic perspective view of a direct reduction vessel.
Figure 2:
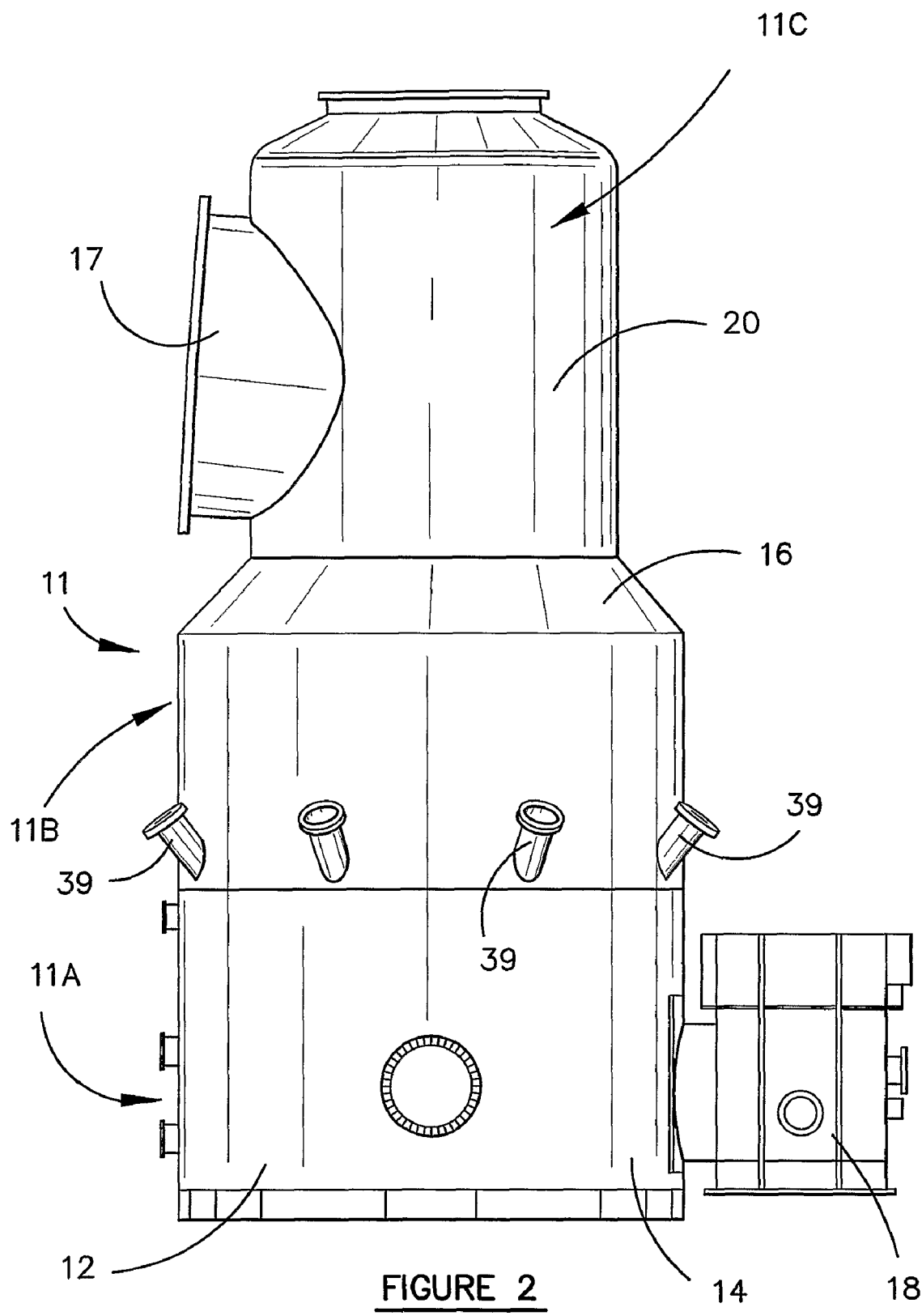
FIG. 2 is an elevation of the direct reduction vessel.
Figure 3:
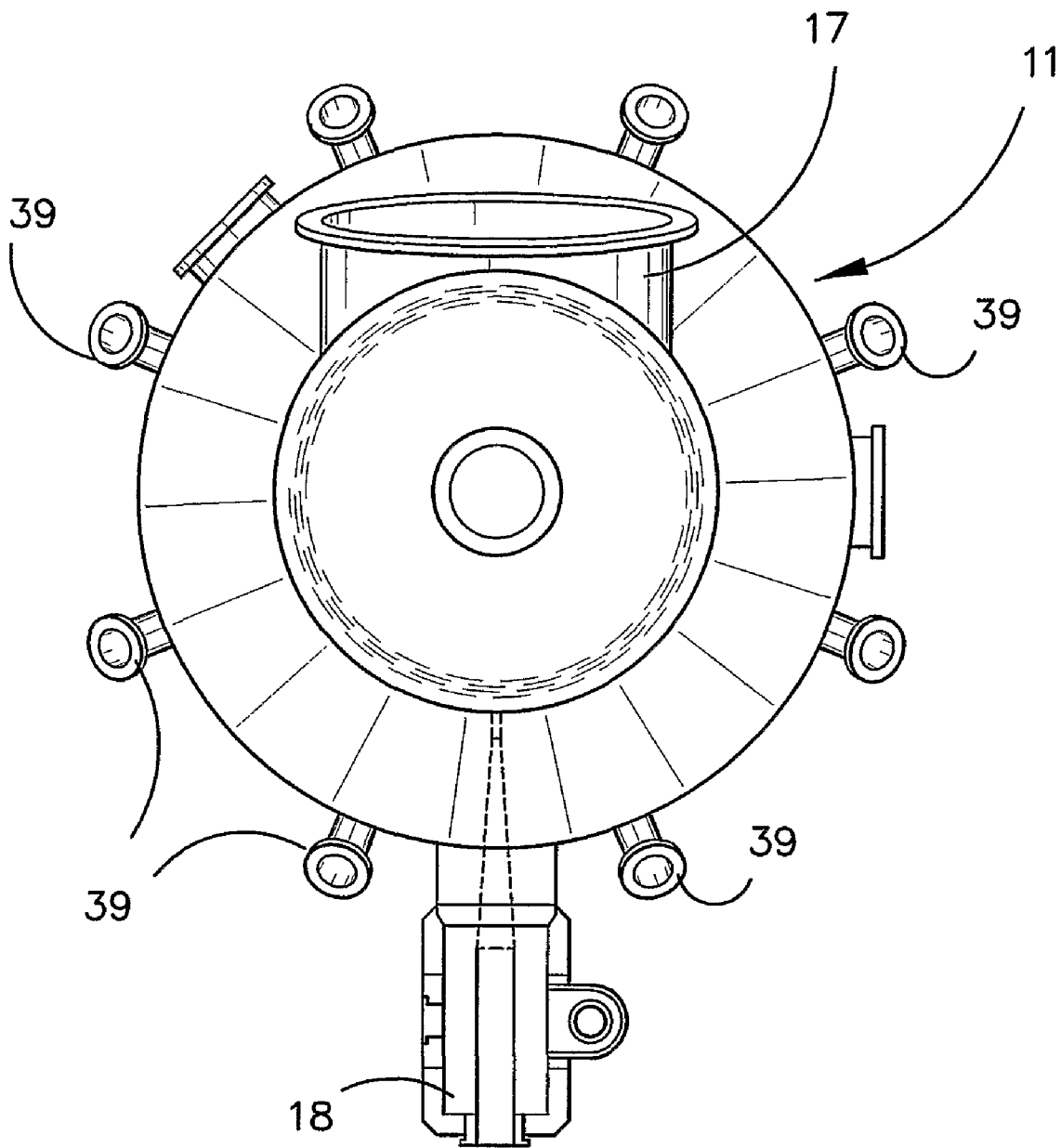
FIG. 3 is a plan of the vessel.
Figure 4:
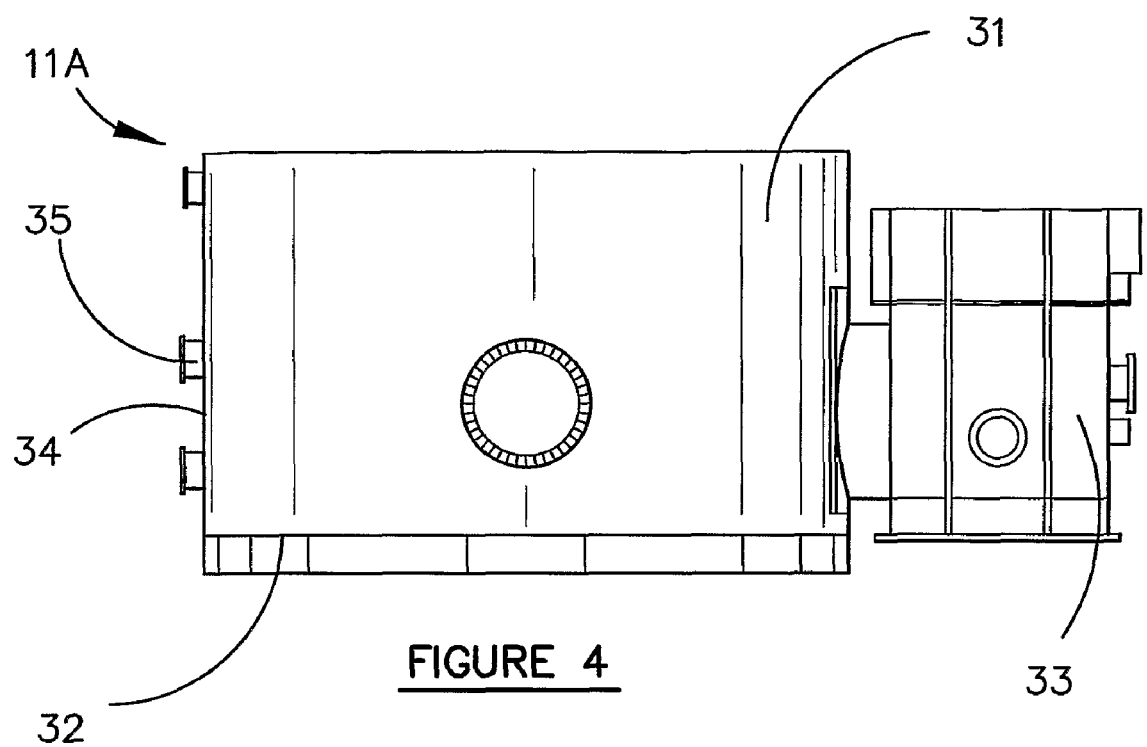
FIG. 4 is an elevation of a base module of the vessel.
Figure 5:
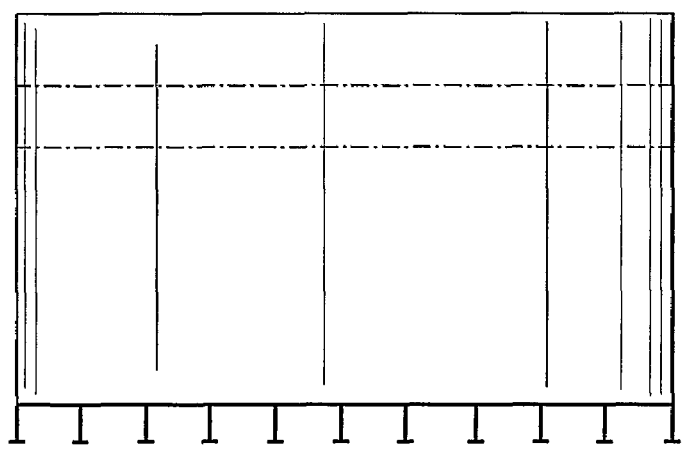
FIG. 5 is a sectional elevation of the base module.
Figure 6:
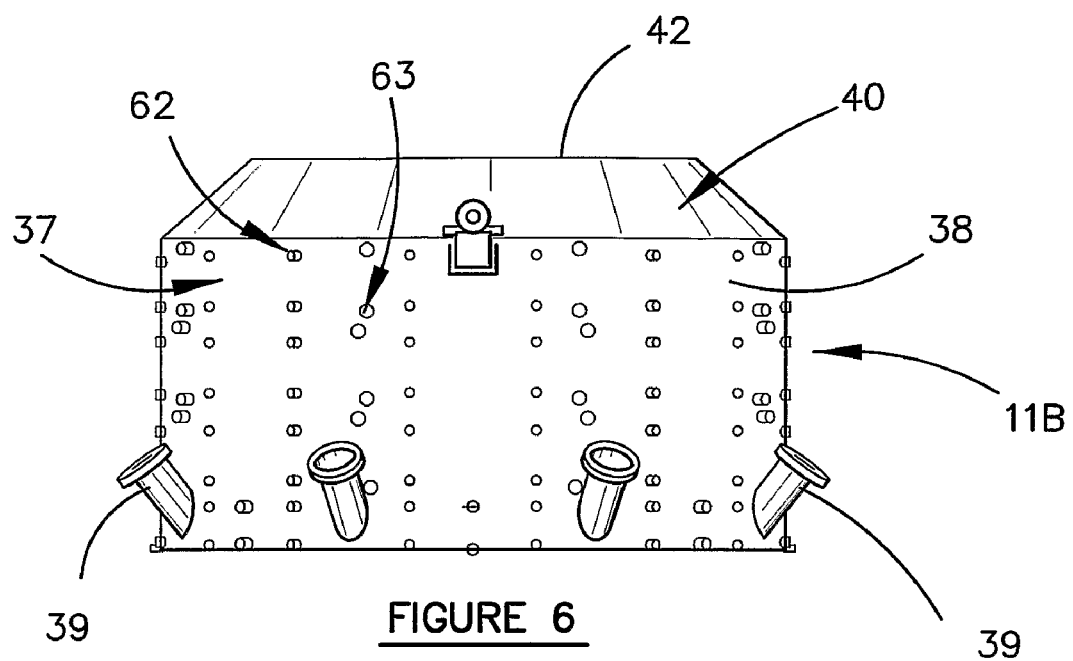
FIG. 6 is an elevation of an intermediate vessel module.
Figure 7:
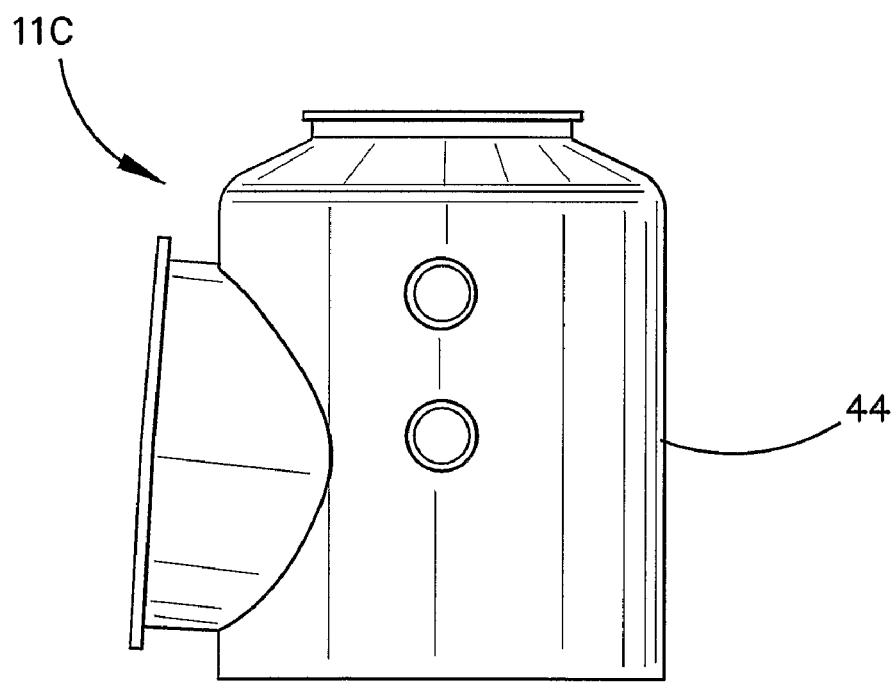
FIG. 7 is an elevation of an upper vessel module.

The drawings show a direct smelting vessel 11 suitable for operation by the HIsmelt process as described in International Patent Publication WO 96/31627. Vessel 11 has a hearth 12 that is lined with refractory bricks; side walls 14 which form a generally cylindrical barrel extending upwardly from the hearth; an upper barrel section 15 and a roof 16 leading to an offgas chamber 20 with an outlet 17 for offgases; a forehearth 18 for discharging molten metal continuously; and a tap hole for discharging molten slag.

Vessel 11 is designed to be fitted with a downwardly extending gas injection lance 21 for delivering a hot air blast into the upper region of the vessel and eight solids injection lances (not shown) extending downwardly and inwardly through the side walls for injecting iron ore, solid carbonaceous material and fluxes entrained in an oxygen deficient carrier gas into the bottom part of the vessel.

Gas injection lance 21 receives an oxygen enriched hot air flow through a hot gas delivery duct that extends from a hot gas supply station located on the plant site in the vicinity of the reduction vessel 11.

The offgas outlet 17 is connected to an offgas duct 24 which transports the offgas away from the reduction vessel 11 to a treatment station located on the plant site a short distance away from the reduction vessel 11.

Hot metal is continuously tapped from vessel 11 through forehearth 18 and flows through appropriate launders to ladles by which it is transported to a desulphurization and casting station.

Slag continuously tapped from vessel 11 flows through slag launders to slag pits located behind vessel.

Vessel 11 is prefabricated off site in three modules 11A, 11B and 11C which are then transported to the direct melting plant site and hoisted by a crane and deposited sequentially on top of one another and joined together by welding to form a unitary vessel. Module 11A is a base module fabricated as a steel plate shell comprising a cylindrical lower barrel 31 for the vessel closed by a bottom floor 32. An outer steel plate shell 33 for the forehearth 18 projects radially outwardly from the lower part of barrel 31. Barrel 31 has a cylindrical circumferential wall 34 fitted with lifting trunions 35 at circumferential spacing to enable the whole module 11A to be lifted by a crane and deposited on site. The lower part of barrel 31 and the forehearth shell 33 are subsequently lined with refractory bricks to form the vessel hearth and forehearth. The lower part of barrel 31 is provided with an access door 36 to allow access for bricking and subsequent maintenance within the vessel. When installed on site, vessel module 11A is located onto a pre-formed concrete foundation pad (not shown). Load bearing members are located intermediate the foundation pad and the underneath surface of the base of the module 11A. The load bearing members are spaced so that air can flow between the foundation pad and the underneath surface of the module 11A. This air flow assists with cooling of the vessel.

The intermediate vessel module 11B is comprised of a cylindrical steel plate section forming an upper barrel 37 of the vessel. This barrel has a cylindrical circumferential wall 38 on which there are mounted eight circumferentially spaced upwardly and outwardly inclined tubular sockets 39 to mount the solids injection lancer.

The cylindrical wall of barrel 31 of base module 11A is of the same diameter as the cylindrical wall of barrel 37 of module 11B. The upper rim of the cylindrical wall of the base module and the lower rim of the cylindrical wall of module 11B are chamfered so that when the two modules are fitted together a V shaped groove is formed to enable the two modules to be connected by a continuous horizontal full penetration weld around the two wall sections to be joined.

The upper part of the circumferential wall 37 of vessel module 11B is formed as an upwardly and inwardly inclined roof section 40 having an upper rim 42 of lesser diameter than the lower part of that peripheral wall. Upper vessel module 11C comprises a cylindrical circumferential wall 44 of the same diameter as the upper rim of the circumferential wall of module 11B and the respective abutting rims of these two modules are chamfered to form a V shaped groove when the two come together to receive a continuous circumferential weld run horizontally around the walls to be connected. Module 11C forms the offgas chamber 20 for the upper part of the vessel and includes the offgas outlet 17 in the form of a flanged tubular spigot for connection to the offgas duct 24. The upper end of the offgas chamber 20 is closed by a circular lid 43 provided with an opening to receive the hot air injection lance for the vessel.

The circumferential walls of the intermediate vessel module 11B and the upper vessel module 11C are lined internally with water cooling panels 51, 52, 53, 54, 55.

The cooling panels consist of a set of forty-eight panels 51 lining an upper part of the cylindrical barrel section of base module 11A and the cylindrical barrel section 37 of the module 11B, a set of sixteen panels 52 lining the tapering roof section 40 of module 11B, and four panels 53, twenty panels 54 and eleven panels 55 lining those parts of the module 11C forming the offgas chamber 50.

Figure 8:
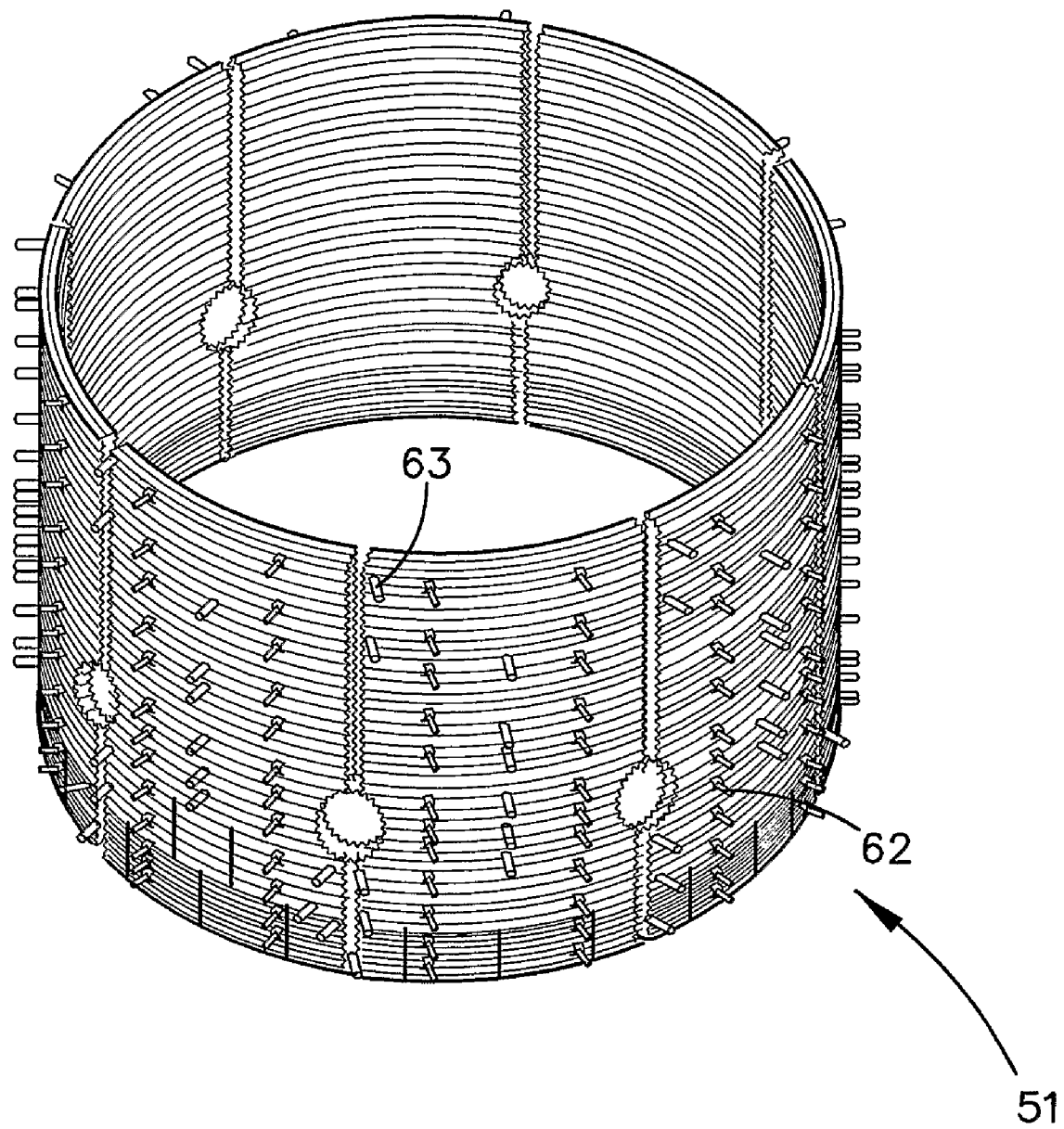
FIG. 8 illustrates the arrangement of cooling panels lining a main cylindrical barrel part of the vessel.
Figure 9:
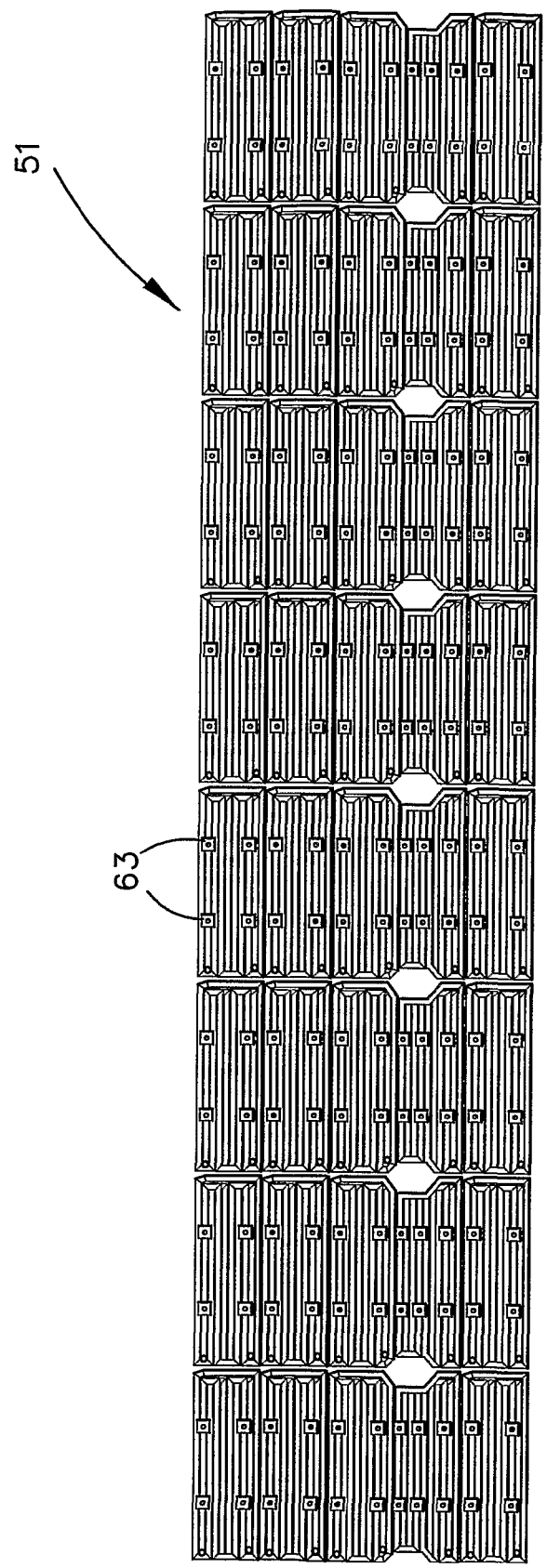
FIG. 9 is a development of the cooling panels shown in FIG. 8.
Figure 10:
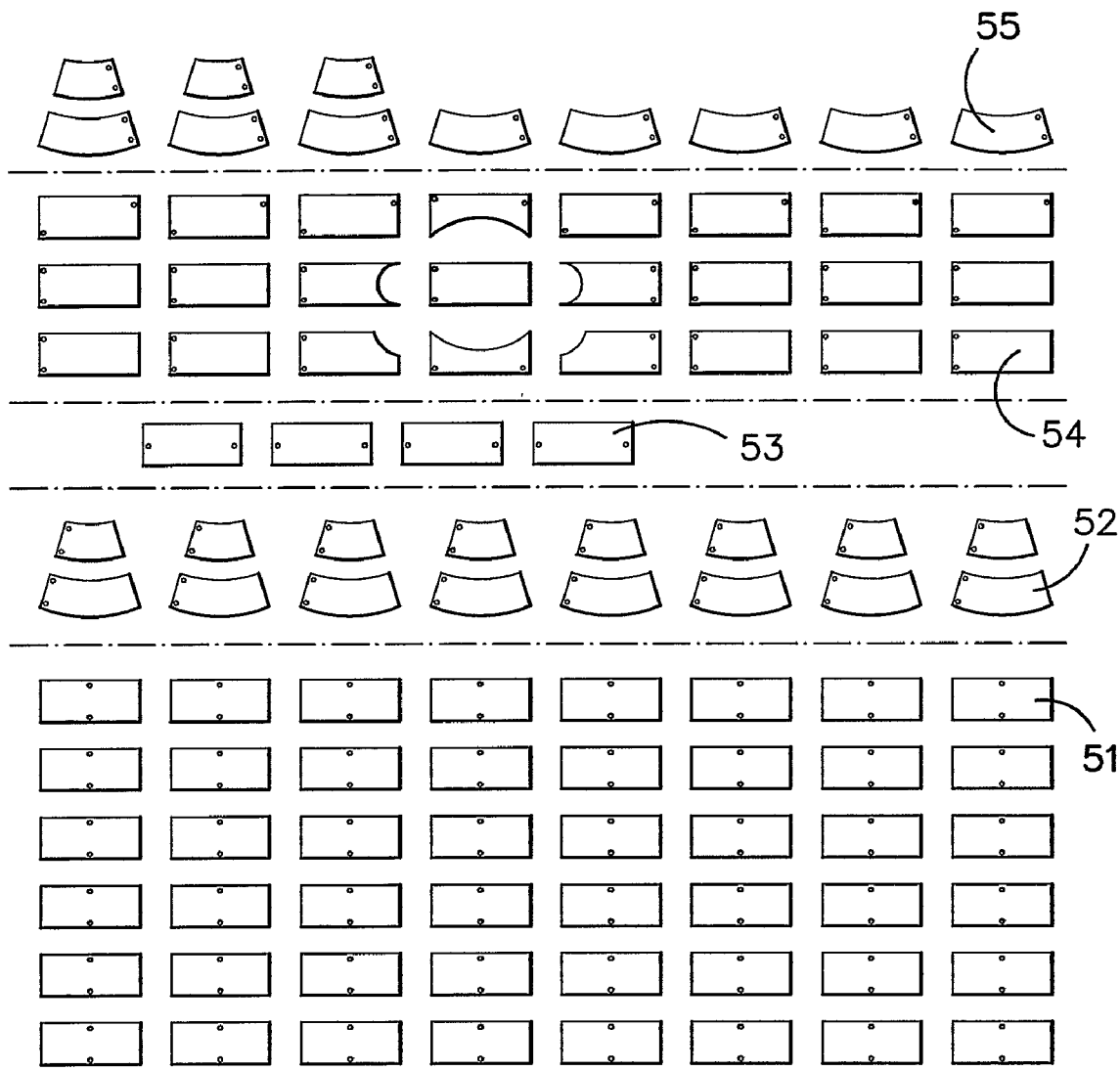
FIG. 10 is a development showing cooling panels fitted to the vessel.
Figure 13:
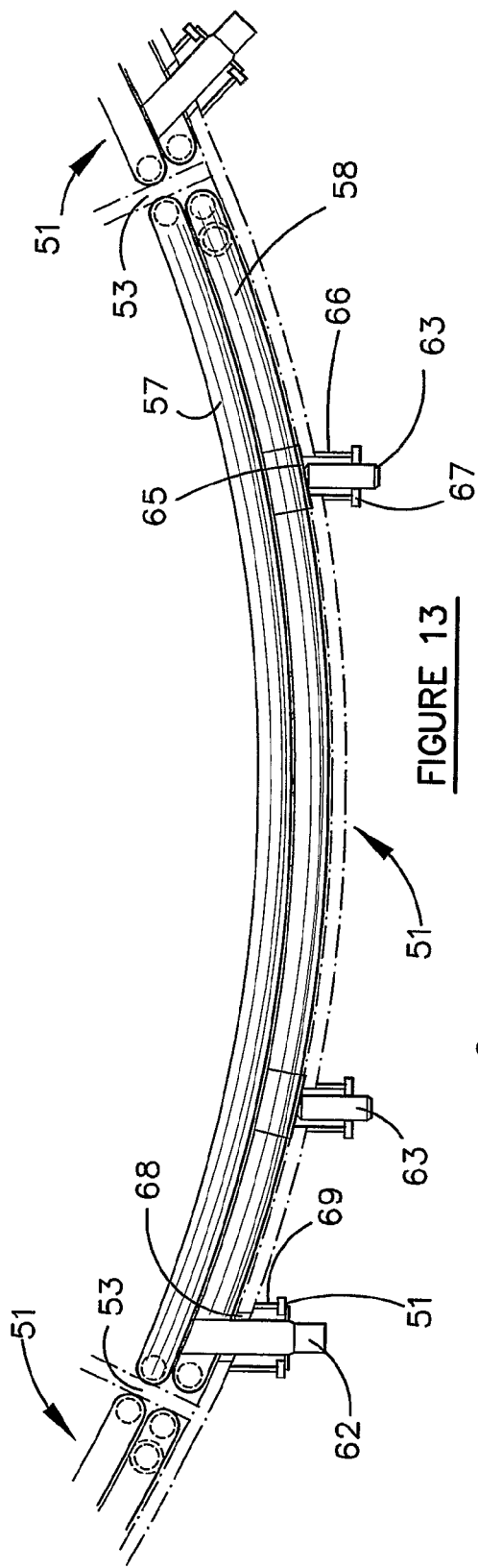
FIG. 13 is a cross-section on the line 13-13 in FIG. 11.
Figure 14:
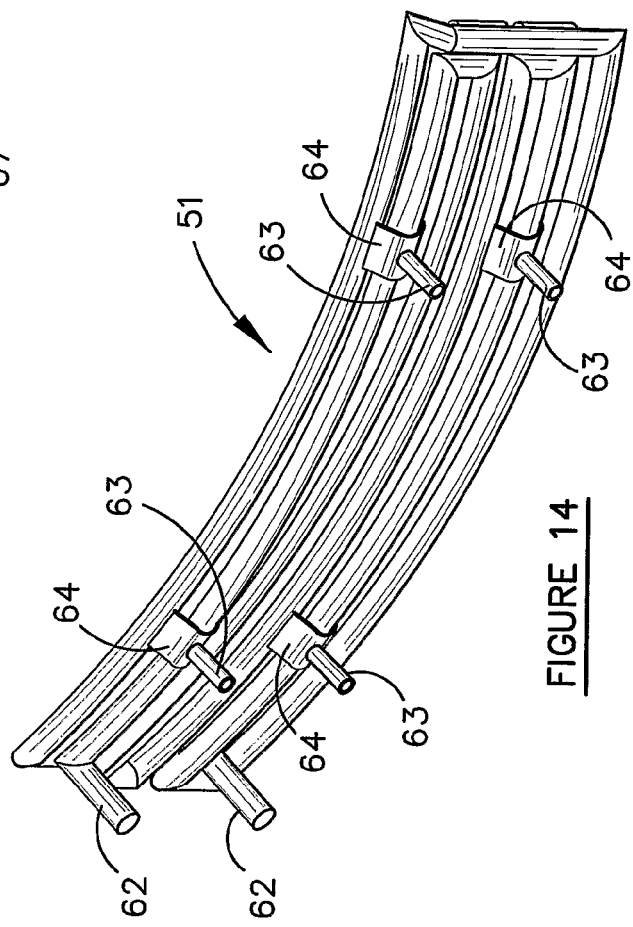
FIG. 14 is a front view of the cooling panel illustrated in FIG. 11.
Figure 15:
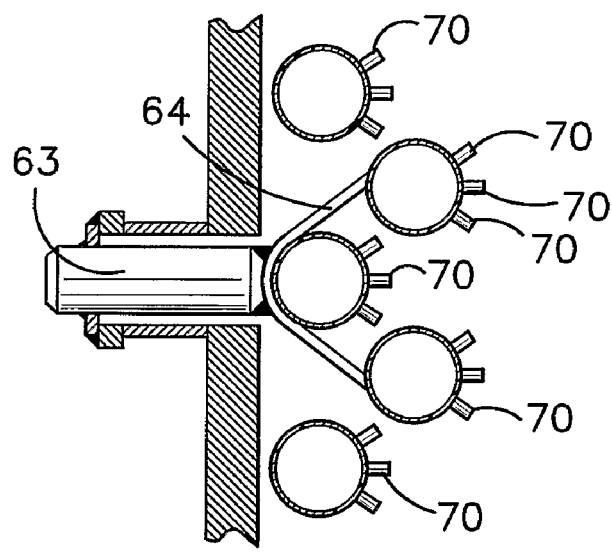
FIG. 15 illustrates a detail of the cooling panel.
Figure 16:
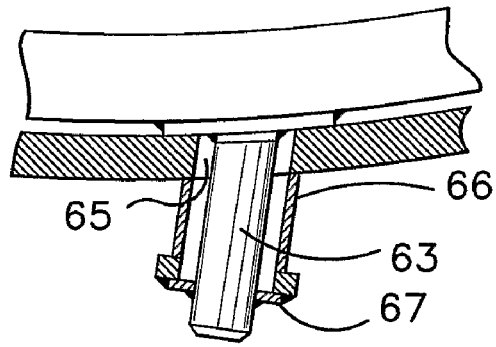
FIGS. 16 and 17 illustrate details of the connection of a cooling panel to the vessel shell.
Figure 17:
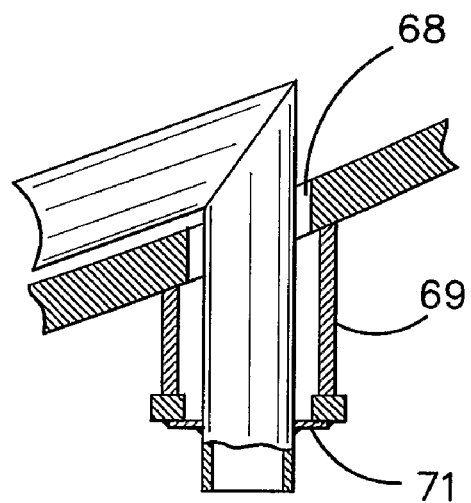

The construction of panels 51 and the manner in which they are mounted on the cylindrical barrel 37 of module 11B is illustrated in FIGS. 11 to 17. As shown in FIGS. 8 to 10, these panels are disposed in 6 vertically spaced tiers of arcuate panels spaced circumferentially of the vessel, there being eight individual panels 31 in each tier. A typical panel 51 is comprised of a coolant flow tube 56 bent to form inner and outer panel sections 57, 58 of zigzag formation. Coolant inlet and outlet tubular connectors 62 extend from the inner panel section at suitable locations and typically at one end of each panel. Panels 51 are of elongate arcuate formation with a curvature to match the curvature of the cylindrical barrel section 37 of the module 11B and the module 11A.

A set of four mounting pins 63 are connected to the zigzag tubular formation of the outer panel section 58 by means of connector straps 64 so as to project laterally outwardly from the panel. Each connector strap 64 is fastened at its ends to adjacent tube segments of the inner panel section and extends between its ends outwardly across a tube segment of the outer panel section in the manner shown most clearly in FIG. 15. The connector straps 64 are generally V-shaped with the root of the V-shape curved to fit snugly about the tube segment of the outer panel section. The pins 63 are welded to the connector straps so as to extend outwardly from the roots of the V-shapes. The connecting straps serve to brace the panels by holding the tube segments securely in spaced apart relationship at multiple locations distributed throughout the panels, resulting in a strong but flexible panel construction.

The mounting pins 63 are extended through openings 65 in the vessel wall and tubular protrusions 66 surrounding the openings 65 and protruding outwardly from the shell. The ends of pins 66 project beyond the outer ends of the tubular protrusions 66 and are connected to the outer ends of those protrusions by welding annular metal discs 67 to the pins and protrusions thus forming connections exteriorly of the shell in a way which seals the openings 65.

In similar fashion the inlet and outlet connectors, 62 for the panel project outwardly through openings 68 in the vessel wall and through and beyond tubular protrusions 69 surrounding those openings and protruding outwardly from the vessel and connections are made by welding annular discs 71, between the connectors 62 and the protrusions 69. In this way, each panel 51 is mounted on the vessel wall through the four pins 63 and the coolant connectors 62 at individual connections exteriorly of the shell. The pins and coolant connectors are a clearance fit within the tubular protrusions tubes 66, 69 and the panel is free to move to accommodate thermal expansion and contraction movements or movements caused by pressure or contact with material within the vessel.

The pins 63 and the coolant inlet and outlet connectors 62 for each panel respectively are oriented so as to project laterally outwardly from the panel in parallel relationship to one another and so as to be parallel with a central plane extended laterally through the panel radially of the vessel so that the panel can be inserted and removed by bodily movement of the panel inwardly or outwardly of the cylindrical barrel of the vessel.

The gaps 53 between the circumferentially spaced panel 51 must be sufficient to enable the trailing outer edges of a panel being removed to clear the inner edges of the adjacent panels when the panel to be removed is withdrawn inwardly of the vessel 11 along the direction of the pins 66 and connectors 63. The size of the gaps required is dependant on the length of the arcuate panels and therefore the number of panels extending the circumference of the barrel section 37. In the illustrated embodiment there are eight circumferentially spaced panels in each of the six tiers of panels 51. It has been found that this allows minimal gaps between the panels and ensures proper cooling of refractory material at the gaps. Generally for satisfactory cooling it is necessary to divide each tier into at least six circumferentially spaced panels.

Refractory retainer pins 70 are butt welded to the coolant tubes of panels 51 so as to project inwardly from the panels and act as anchors for the refractory material sprayed onto the panels. Pins 70 may be arranged in groups with these pins radiating outwardly from the respective tube and arranged at regular spacing along the tube throughout the panel.

The panels 53 and 54, being fitted to cylindrically curved sections of the vessel, are formed and mounted in the same fashion as the panels 51 as described above, but some of the panels 54 are shaped in the manner shown in FIG. 10 so as to fit around the offgas outlet 17.

The panels 52 and 55, being fitted to tapered sections of the vessel, are generally conically curved in the manner shown in the illustrated development of FIG. 10. Except for this variance in shape. However, these panels are also formed and mounted to the shell in similar fashion to the panels 51, each being fitted with mounting pins projecting laterally outwardly from the panel and a pair of inlet/outlet coolant connectors at opposite ends of the panels, the pins and connectors being extended through openings in the shell and connected to tubes projecting laterally outwardly from the shell to form connections exteriorly of the shell which seal the openings and provide a secure mounting for the panels while permitting some freedom of movement of the panels.

Figure 18:
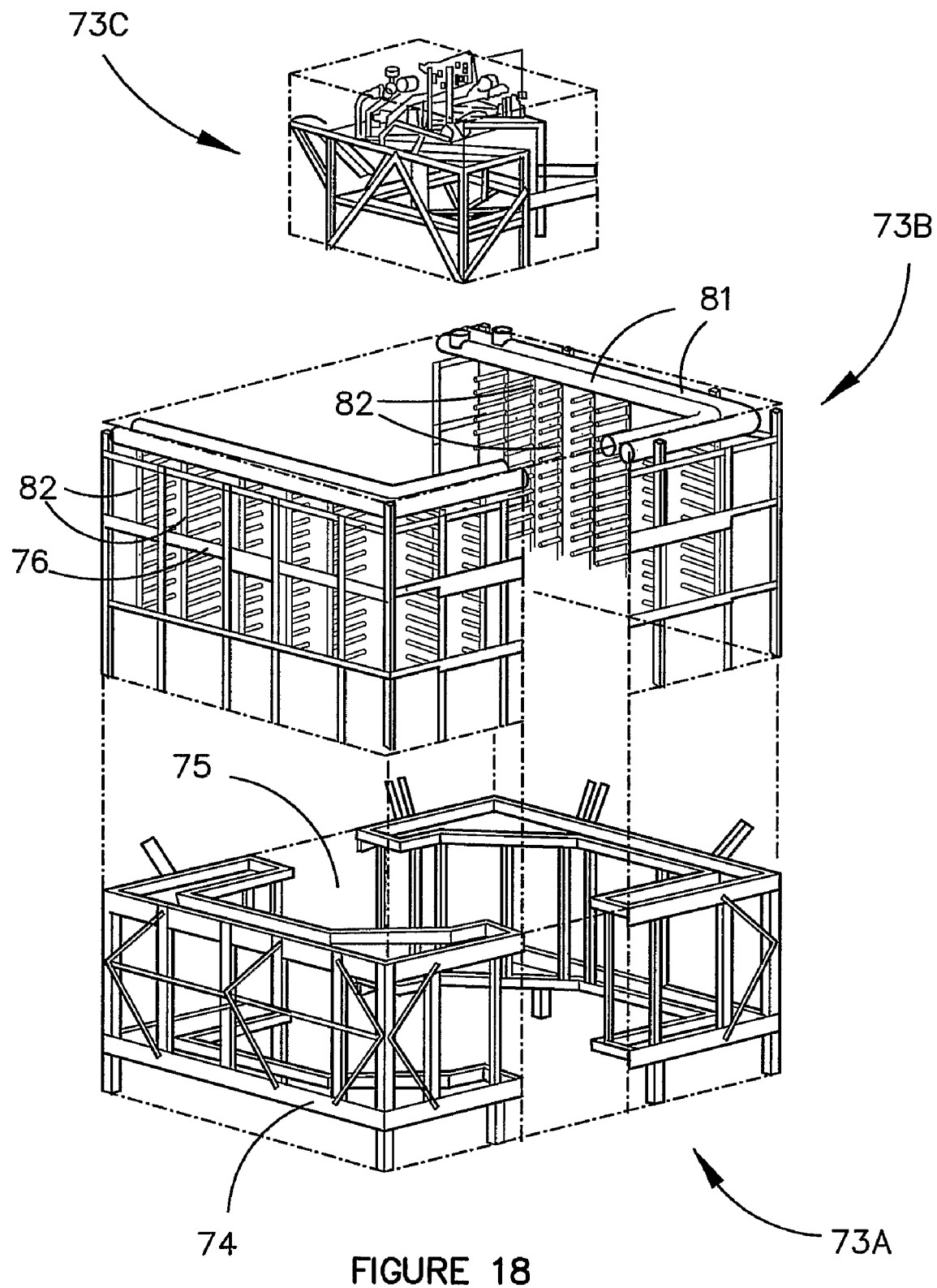
FIG. 18 illustrates lower centre and upper modules of a vessel access tower.
Figure 19:
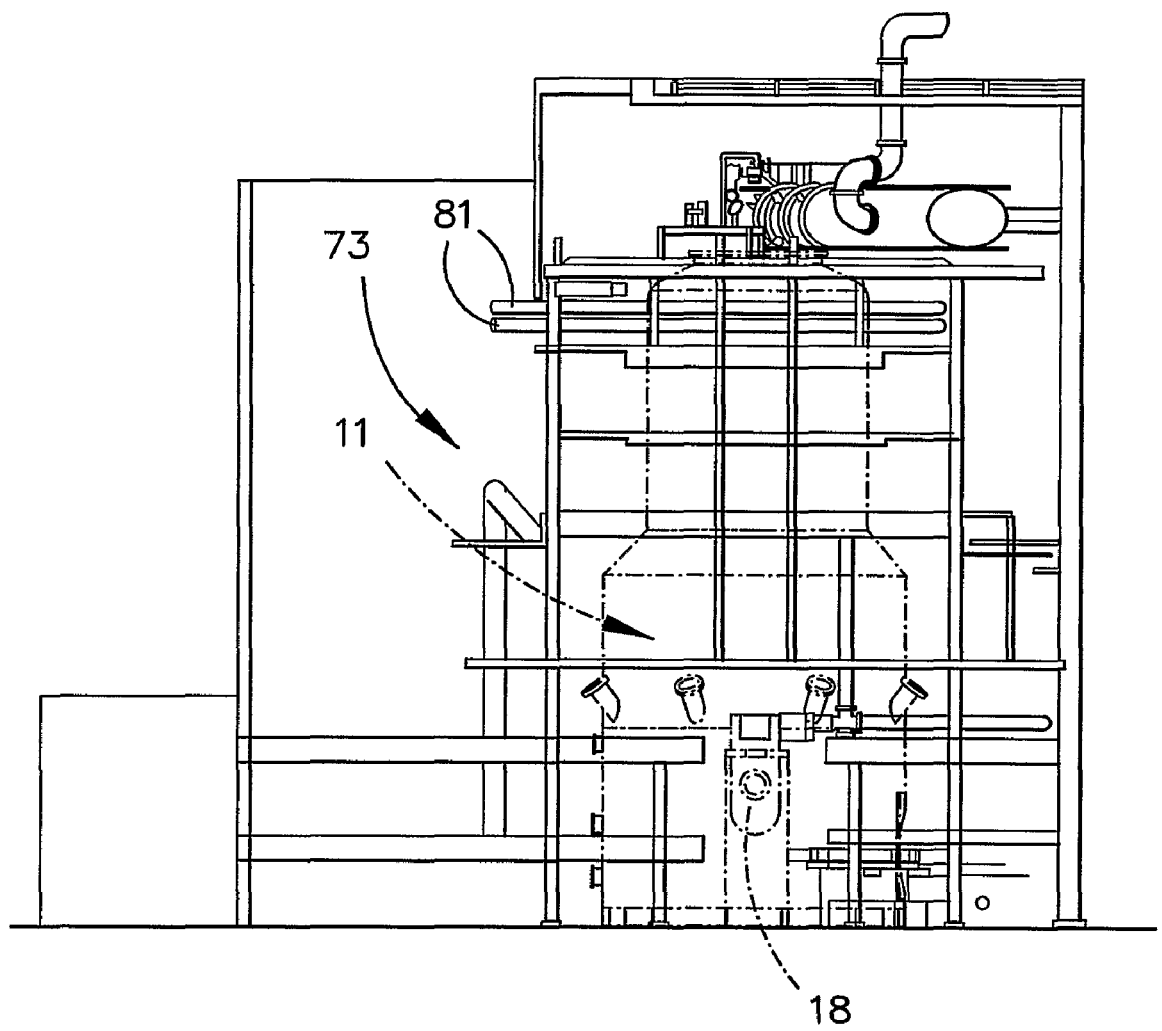
FIG. 19 is an elevation of an assembled tower enveloping a smelting vessel.

FIGS. 18 and 19 show a vessel access tower 73 formed in three modules 73A, 73B and 73C. This tower is constructed so that in the final installation it can extend about and substantially envelop the vessel 11. Tower module 73A is a base module comprising a steel framework 74 with a central opening 75 to receive the base module 11A of the vessel. Module 73B is a centre tower module comprising a framework 76 of generally U shaped formation to fit around the intermediate and upper modules 11B and 11C of the vessel. Upper tower module 73C is designed to fit down onto an upper part of tower module 73B to extend over the top of the upper part of the vessel and provide access to the hot air blast duct and the hot air blast lance 21.

Tower modules 73A and 73B are designed to come together and to be connected by welding at the same level as the connection between the base module 11A and the intermediate module 11B of the vessel. These two tower modules carry water supply and return piping comprising U shaped supply and return manifolds 81 and vertical supply and return pipes 82 for individual connection to the water panel inlet and outlet connectors 62, these connections being made by flexible hose connections to the supply and return pipes.

The vessel modules 11A, 11B and 11C and the tower modules 73A, 73B and 73C can be fabricated off site and brought to the plant for installation as part of the iron making unit for the plant. Normally the vessel would be prefabricated in a factory specializing in heavy metal fabrications and with appropriate heavy duty lifting and welding equipment.

After fabrication the individual vessel and tower modules are transported to the direct smelting plant site for installation. The order in which the various tower and vessel modules are lifted sequentially into place can be varied. Typically the tower base module 73A would be installed as a first step. The base module of the vessel could then be lifted and dropped into position within the base module of the tower. Alternatively the central tower section 73B could be lifted into position and connected to the tower module 73A before installing the successive vessel modules 11A, 11B and 11C. The upper tower module 73C is installed as a final step in the assembly.

Figure 20:
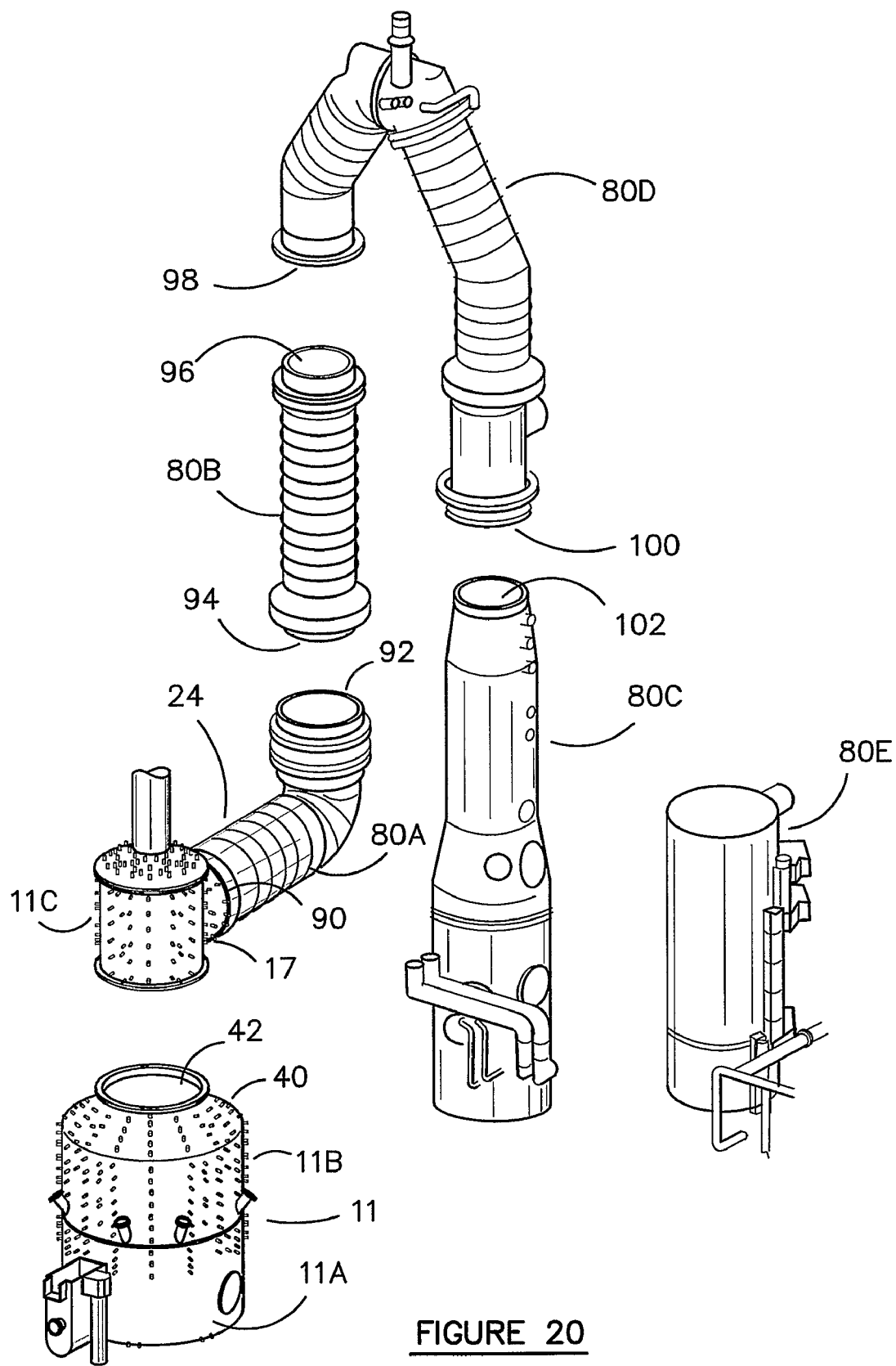
FIG. 20 depicts the modular components of the vessel and off-gas ducting and treatment system.

In addition to vessel modules 11A, 11B, 11C and tower modules 73A, 73B and 73C, the off-gas ducting and treatment station may be constructed off-site in a series of modules 80A, 80B, 80C, 80D and 80E as depicted in FIG. 20.

Module 80A is an off-gas duct that extends substantially horizontally (or at a slight incline in the region of 5 to 15 degrees to the horizontal) from the off-gas duct outlet of vessel module 11C. Module 80A has a first outlet 90 that is oriented within a vertical plane for connection to the off-gas outlet of module 11C. Module 80A has a second outlet 92 disposed within a substantially horizontal plane to enable it to connect with a module having a substantially vertical orientation.

Module 11C and module 80A may be connected together prior to installation so that they are located in place as a single module. In other words, module 11C may be installed onto Module 11B with module 80A already attached to its off-gas outlet.

Module 80B is a straight section of ducting that is installed with a vertical orientation. It has a first outlet 94 that connects with the second outlet 92 of module 80A. Module 80B also has a second outlet 96 that connects with outlet 98 of Module 80D.

Module 80C is a wet scrubber that is generally cylindrical with an outlet 102 located in a horizontal plane so as to connect with outlet 100 of Module 80D.

Module 80D has a generally inverted U-shape with outlet 98 located in a horizontal plane and that connects with outlet 96 of Module 80B. Module 80D also has outlet 100 that is located in a horizontal plane and that connects with outlet 102 of module 80C.

Module 80E is a gas cooler that receives gas from the wet scrubber (Module 80C) and acts to further cool the off-gas below the temperature provided by the wet scrubber and this assists to lower the moisture content of the off-gas. Ducting (not shown) connects the wet scrubber (Module 80C) with the off-gas cooler (Module 80E).

Figure 21:
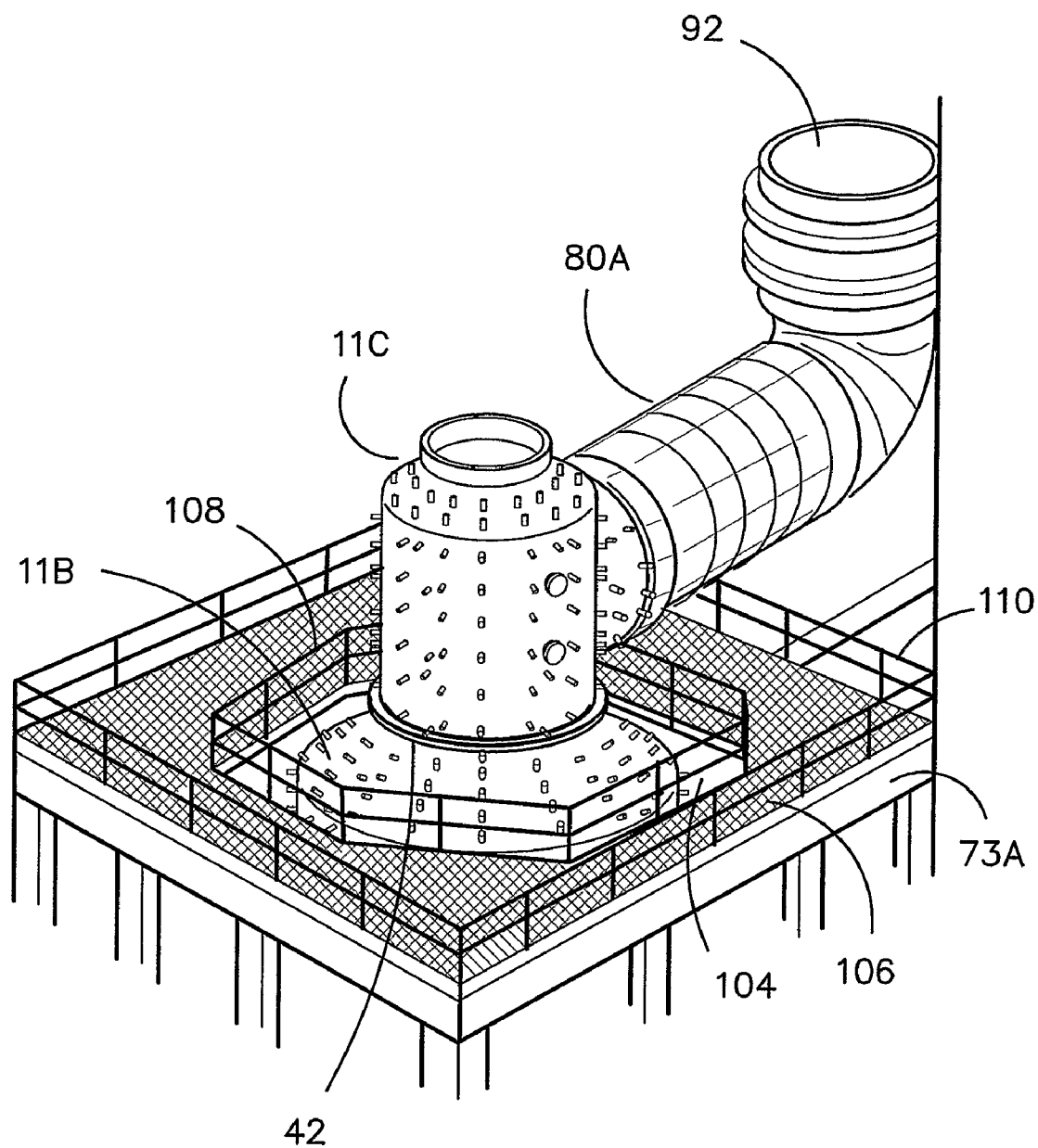
FIG. 21 depicts installation of off-gas chamber module and an off-gas ducting module onto barrel module and a tower access module.

FIG. 21 depicts Module 11C and Module 80A installed as a single unit onto circumferential join 42 of module 11B. Tower module 73A has been previously installed over modules 11A and 11B prior to the installation of modules 11C and 80A. Tower access module 73A is installed such that an upper level provided by flooring 106 (shown in shading) is at substantially the same height as circumferential join 42 on Module 11B. Aperture 104 in flooring 106 allows module 11C to connect at the circumferential join 42 on Module 11B. Hand rail 108 surrounds aperture 104 and hand rail 110 surrounds flooring 106.

The illustrated equipment has been advanced by way of example only. The physical construction of this equipment could be varied considerably as could the precise order in which the various modules are brought together. It is to be understood that such variations can be made within the scope of the appended claims.

The invention claimed is:

1. A method of constructing and thereafter installing at a direct smelting plant site a smelting unit comprising a direct smelting vessel, which method comprises the steps of:

prefabricating away from a predetermined location of the plant site for the direct smelting vessel, a base module, an intermediate module, and an upper module to be brought together to form the vessel, each module comprising a cylindrical vessel wall section formed of steel plate, transporting the prefabricated modules to the predetermined location and depositing sequentially the base module, the intermediate module, and the upper module on top of one another by depositing the intermediate module onto the base module and connecting the intermediate module to an upper part of the base module, and by depositing the upper module on an upper part of the intermediate module and connecting the upper module to the upper part of the intermediate module, joining the modules together by one or more continuous horizontal circumferential welds between successive cylindrical wall sections of the modules to form a unitary direct smelting vessel, prefabricating away from said predetermined location a plurality of tower modules to be brought together to form a vessel access tower that extends about the vessel at the completion of installation, transporting the prefabricated tower modules to the predetermined location, and depositing the prefabricated tower modules sequentially on top of one another and joining them together to form the tower, wherein the base and intermediate modules of the vessel and adjacent tower modules are installed prior to the installation of the upper module of the vessel.

2. A method as claimed in claim 1, wherein a concrete foundation pad is pre-formed at the predetermined location to receive the base module.

3. A method as claimed in claim 2, wherein a series of load bearing members are located intermediate an external bottom surface of the base module and an upper surface of the concrete foundation pad to thereby enable air to flow between the base module and the foundation pad.

4. A method as claimed in claim 1, wherein the base module includes a hearth and a forehearth for discharging molten metal.

5. A method as claimed in claim 4, wherein the hearth and forehearth are lined with refractory bricks after installation at the smelting plant site.

6. A method as claimed in claim 1, wherein the intermediate vessel module comprises a generally cylindrical barrel section provided with a tap hole for discharging molten slag.

7. A method as claimed in claim 1, wherein the upper vessel module is provided with an outlet for off gases.

8. A method as claimed in claim 2, wherein at least one of the intermediate and upper vessel modules is prefabricated so as to be internally lined with water cooling panels connected to water inlet and outlet connectors on the exterior of the circumferential wall section of that module.

9. A method as claimed in claim 1, wherein the intermediate vessel module and the upper vessel module are both prefabricated so as to be internally lined with water cooling panels connected to water inlet and outlet connectors on the exterior of the circumferential wall sections of those modules.

10. A method as claimed in claim 8, wherein the base module is prefabricated so as to be partially internally lined with water panels connected to respective water inlet and outlet connectors on the exterior of the circumferential wall section of the base module.

11. A method as claimed in claim 1, wherein at least one pair of the tower modules is connected together at the same level as the connection between a pair of the vessel modules.

12. A method as claimed in claim 1, wherein at least some of the tower modules are installed before the vessel modules about which they are to extend are installed, the latter vessel modules being deposited downwardly into the interior of the installed tower modules.

13. A method according to claim 1, further comprising the steps of:
   pre-fabricating off-gas ducting and treatment modules to be brought together to form off-gas ducting and treatment apparatus,
   transporting to site said off-gas ducting and treatment modules, and
   installing the off-gas ducting and treatment modules in a predetermined order to provide a continuous gas tight connection between an outlet of the upper vessel module and the off-gas ducting and treatment apparatus.

14. The method of claim 13 wherein at least one of the off-gas ducting and treatment modules comprises a wet scrubber with substantially vertical orientation and having an outlet disposed to receive a substantially vertical section of off-gas ducting.

15. The method of claim 13, wherein said outlet of said upper vessel module is disposed within a substantially vertical plane and connects with a first off-gas ducting module disposed at an angle to a horizontal axis of between zero and fifteen degrees.

16. The method of claim 15, wherein said upper vessel module is connected with said first off-gas ducting module prior to installation whereby both said modules are installed onto said intermediate module as a single module.

17. The method of claim 15, wherein said first off-gas ducting module has an outlet remote from said upper vessel module and disposed to receive a further off-gas ducting module extending vertically upwardly.

18. The method of claim 13, wherein said off-gas ducting comprises an off-gas ducting module arranged with a substantially inverted U-shape, each leg of said substantially inverted U-shape off-gas ducting module having an outlet for connection with an outlet of a vertically extending off-gas ducting module.

19. The method of claim 18, wherein one of said outlets of said vertically extending off-gas ducting modules for connection with an outlet of each leg comprises an outlet of a wet scrubber.

20. The method as claimed in claim 1, wherein subsequent to installation of the upper module of the vessel a tower module is installed adjacent the upper module.

21. The method as claimed in claim 1, wherein the upper module and a section of an off-gas duct are installed as single unit.

\* \* \* \* \*